(12) United States Patent
Battach et al.

(10) Patent No.: US 11,544,461 B2
(45) Date of Patent: Jan. 3, 2023

(54) EARLY EXIT FOR NATURAL LANGUAGE PROCESSING MODELS

(71) Applicant: Intel Corporation, Santa Clara, CA (US)

(72) Inventors: Barak Battach, Ramat-Gan (IL); Amit Bleiweiss, Yad Binyamin D (IL); Haim Barad, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 16/411,763

(22) Filed: May 14, 2019

(65) Prior Publication Data

US 2019/0266236 A1    Aug. 29, 2019

(51) Int. Cl.
*G06F 40/30* (2020.01)
*G06N 20/00* (2019.01)
*G06F 40/284* (2020.01)
*G06F 40/216* (2020.01)

(52) U.S. Cl.
CPC .......... *G06F 40/284* (2020.01); *G06F 40/216* (2020.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 8,352,405 B2 * | 1/2013 | Fang | G06F 40/247 706/50 |
| 9,997,161 B2 * | 6/2018 | Gong | G10L 15/26 |
| 10,453,460 B1 * | 10/2019 | Wightman | G06F 16/316 |
| 10,599,953 B2 * | 3/2020 | Brown | G06F 16/358 |
| 10,878,808 B1 * | 12/2020 | Mathias | G10L 15/22 |
| 10,937,444 B1 * | 3/2021 | Suendermann-Oeft | G06N 3/0481 |
| 10,943,583 B1 * | 3/2021 | Gandhe | G10L 15/183 |
| 11,182,568 B2 * | 11/2021 | Ishida | G06F 40/279 |
| 2004/0148170 A1 * | 7/2004 | Acero | G06F 40/216 704/257 |
| 2014/0149103 A1 * | 5/2014 | Child | G06F 40/242 704/8 |
| 2017/0147682 A1 | 5/2017 | Alaqeeli et al. | |
| 2017/0228365 A1 * | 8/2017 | Levy | G06F 40/30 |
| 2018/0025076 A1 * | 1/2018 | Bastide | H04L 51/32 707/728 |
| 2018/0246953 A1 * | 8/2018 | Oh | G06N 5/003 |
| 2018/0315182 A1 * | 11/2018 | Rapaka | G16H 50/70 |
| 2019/0130285 A1 * | 5/2019 | Snyder | G06Q 30/0631 |
| 2019/0294999 A1 * | 9/2019 | Guttmann | G06N 5/047 |
| 2020/0065716 A1 * | 2/2020 | Aharonov | G06F 17/18 |

(Continued)

OTHER PUBLICATIONS

Yu et al., "Fast and Accurate Text Classification: Skimming, Rereading and Early Stopping" Workshop track—ICLR 2018.

(Continued)

*Primary Examiner* — Lamont M Spooner
(74) *Attorney, Agent, or Firm* — KDB Firm PLLC

(57) ABSTRACT

The disclosure provides a natural language processing (NLP) model arranged to operate on two lexicons, where one lexicon is a sub-set of the other lexicon. The NLP model can be arranged to generate output based on the sub-set lexicon and exit processing of the NLP model, to potentially save computation cycles.

20 Claims, 8 Drawing Sheets

(56) References Cited

U.S. PATENT DOCUMENTS

2020/0104746 A1* 4/2020 Strope ..................... G06N 5/04
2020/0125893 A1* 4/2020 Choi ................... G06F 11/3409
2020/0320254 A1* 10/2020 Hebenthal ................ G06N 5/04

OTHER PUBLICATIONS

Wikipedia—"AI accelerator" retrieved May 9, 2019. URL: https://en.wikipedia.org/w/index.php?title=AI_acceloerator&oldid=896222309.
European Search Report and Written Opinion for the European Patent Application No. EP20164778, dated Oct. 12, 2020, 7 pages.

* cited by examiner

EARLY EXIT FOR NATURAL LANGUAGE PROCESSING MODELS

BACKGROUND

Computing devices are increasingly utilized to process "natural language" or human language. However, compute requirements for many natural language processing tasks are significant due to the size of the vocabulary of the natural language.

DETAILED DESCRIPTION

Figure 1:
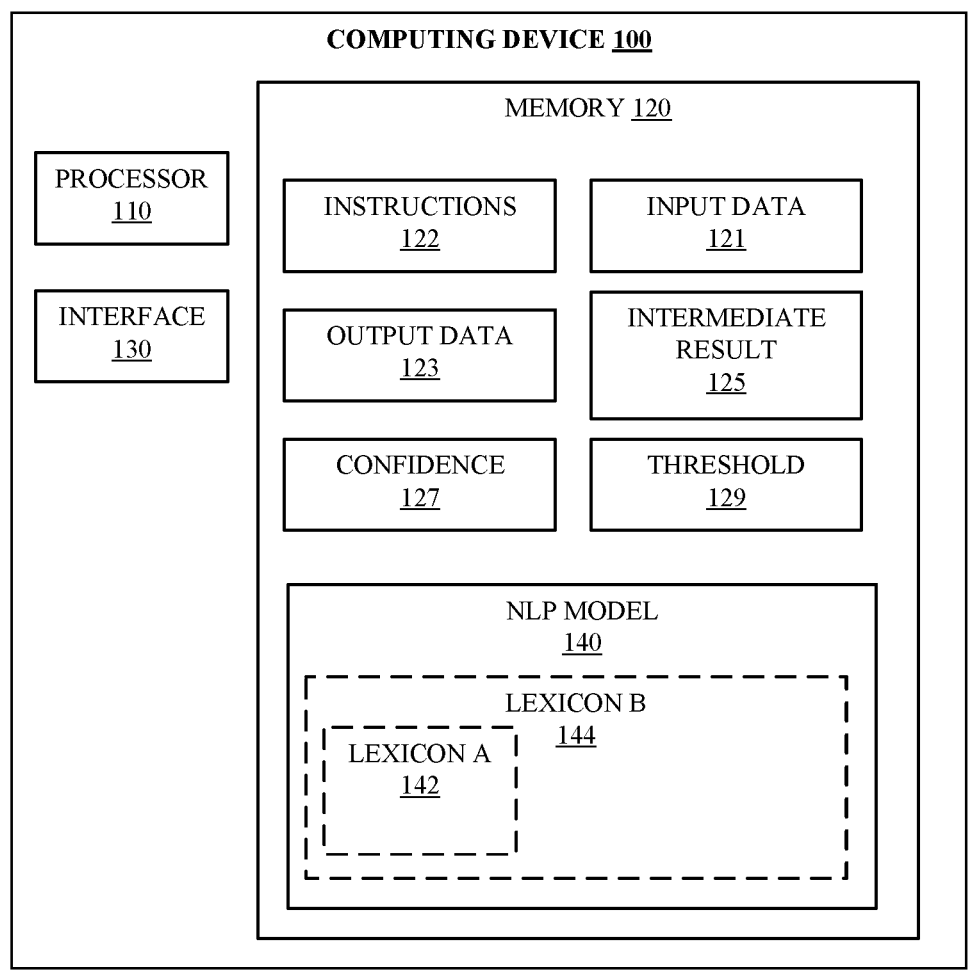
FIG. 1 illustrates a computing device.

Embodiments disclosed herein provide early exit mechanisms for natural language processing (NLP). That is, the present disclosure provides systems arranged to execute NLP models where execution of the NLP model can be stopped prior to completion and an output generated. For example, the present disclosure provides a computing device arranged to execute an NLP model. The computing device can be arranged to generate output from the NLP model during execution (e.g., prior to completing execution of the NLP model) using a first vocabulary. The computing device can be arranged to exit execution of the NLP model (e.g., early, or prior to completion) based on the generated output. Alternatively, the computing device can be arranged to complete execution of the NLP model and generate output using a second vocabulary, larger than the first vocabulary, or which includes the first vocabulary.

The present disclosure can be implemented with an NLP model composed of a number of encoders arranged to process an NLP task. It is noted, that this type of NLP model is one of many different NLP models to which the present disclosure can be applied. The NLP model can further include a first classifier arranged to generate output using a first vocabulary and a second classifier arranged to generate output using a second vocabulary, where the second vocabulary is larger than the first vocabulary. In some cases, the first vocabulary can be a subset of the second vocabulary. For example, the first vocabulary can include "common" or more frequently used tokens (e.g., symbols, letters, numbers, words, etc.) of a language while the second vocabulary can include these common tokens as well as other tokens of the vocabulary.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations may be referred to in terms, such as adding or comparing, which are commonly associated with logical operations. Useful machines for performing these logical operations may include general purpose digital computers as selectively activated or configured by a computer program that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates a computing device 100. The computing device 100 is representative of any number and type of devices, arranged to process inference models, and particularly, natural language processing (NLP) models. The computing device 100 includes a processor 110, memory 120, and interface 130.

The processor 110 may include circuitry or processor logic, such as, for example, any of a variety of commercial processors. In some examples, the processor 110 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 110 may include graphics processing portions and may include dedicated memory, multiple-threaded processing and/or some other parallel processing capability. In some examples, the processor 110 may be an application specific integrated circuit (ASIC) or a field programmable integrated circuit (FPGA). In some implementations, the processor 110 may be circuitry arranged to perform computations related to artificial intelligence (AI), sometimes referred to as an accelerator, or AI accelerator.

The memory 120 may include logic, a portion of which includes arrays of integrated circuits, forming non-volatile memory to persistently store data or a combination of non-volatile memory and volatile memory. It is to be appreciated, that the memory 120 may be based on any of a variety of technologies. In particular, the arrays of integrated circuits included in memory 120 may be arranged to form one or more types of memory, such as, for example, dynamic random access memory (DRAM), NAND memory, NOR memory, or the like.

Interface 130 may include logic and/or features to support a communication interface. For example, the interface 130 may include one or more interfaces that operate according to various communication protocols or standards to communicate over direct or network communication links. Direct communications may occur via use of communication protocols or standards described in one or more industry standards (including progenies and variants). For example, the interface 130 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, interface 130 may be arranged to support wireless communication protocols or standards, such as, for example, Wi-Fi, Bluetooth, ZigBee, LTE, 5G, or the like.

Memory 120 stores instructions 122, natural language processor (NPL) model 140, input data 121, output data 123, intermediate result 125, confidence 127, and threshold 129.

NLP model 140 is arranged to operate on lexicon A 142 and lexicon B 144. That is, NLP model 140 is arranged to perform any number and variety of NLP operations (e.g., translation, speech recognition, text-to-speech, speech segmentation, summarization, coreference resolution, grammar induction, optical character recognition, word segmentation, sentence breaking, parsing, etc.) for lexicon A 142 and lexicon B 144. With many implementations, lexicon A 142 is a sub-set of lexicon B 144. That is, the vocabulary of lexicon B 144 includes the vocabulary of lexicon A 142. In general, the vocabulary of lexicon A 142 corresponds to the "commonly" or "frequently" used tokens of the vocabulary of lexicon B 144. This is explained in greater detail below, for example, with reference to FIG. 4.

NLP model 140 can be any of a variety of machine learning models, such as, for example, a sequence-to-sequence model, an encoder decoder model, a transformer model, or the like. As a specific example, NLP model 140 can be a bidirectional encoder representations from transformers (BERT) model, embeddings from language models (ELMo) model, generative pre-training (GPT) model, or the like.

In general, processor 110 can execute instructions 122 to execute NLP model 140 to generate output data 123 from input data 121. Said differently, processor 110 can execute NLP model 140 to generate output data 123 based on input data 121. Furthermore, with some examples, processor 110 can execute instructions 122 to receive input data 121 (e.g., from a remote computing device or storage device via interface 130, or the like) and to provide output data 123 (e.g., to the remote computing device or storage device via interface 130).

Figure 2:
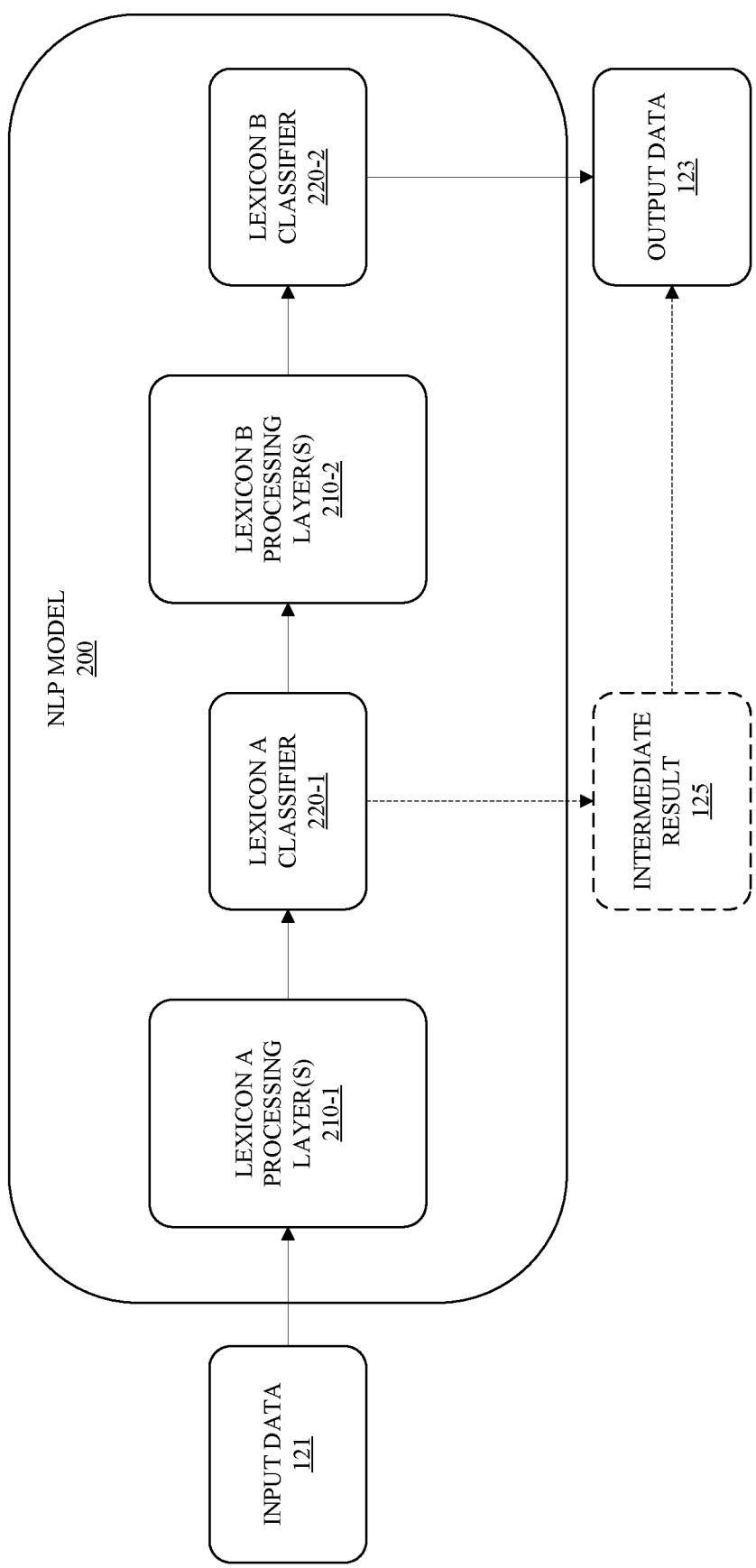
FIG. 2 illustrates an NLP model.
Figure 4:
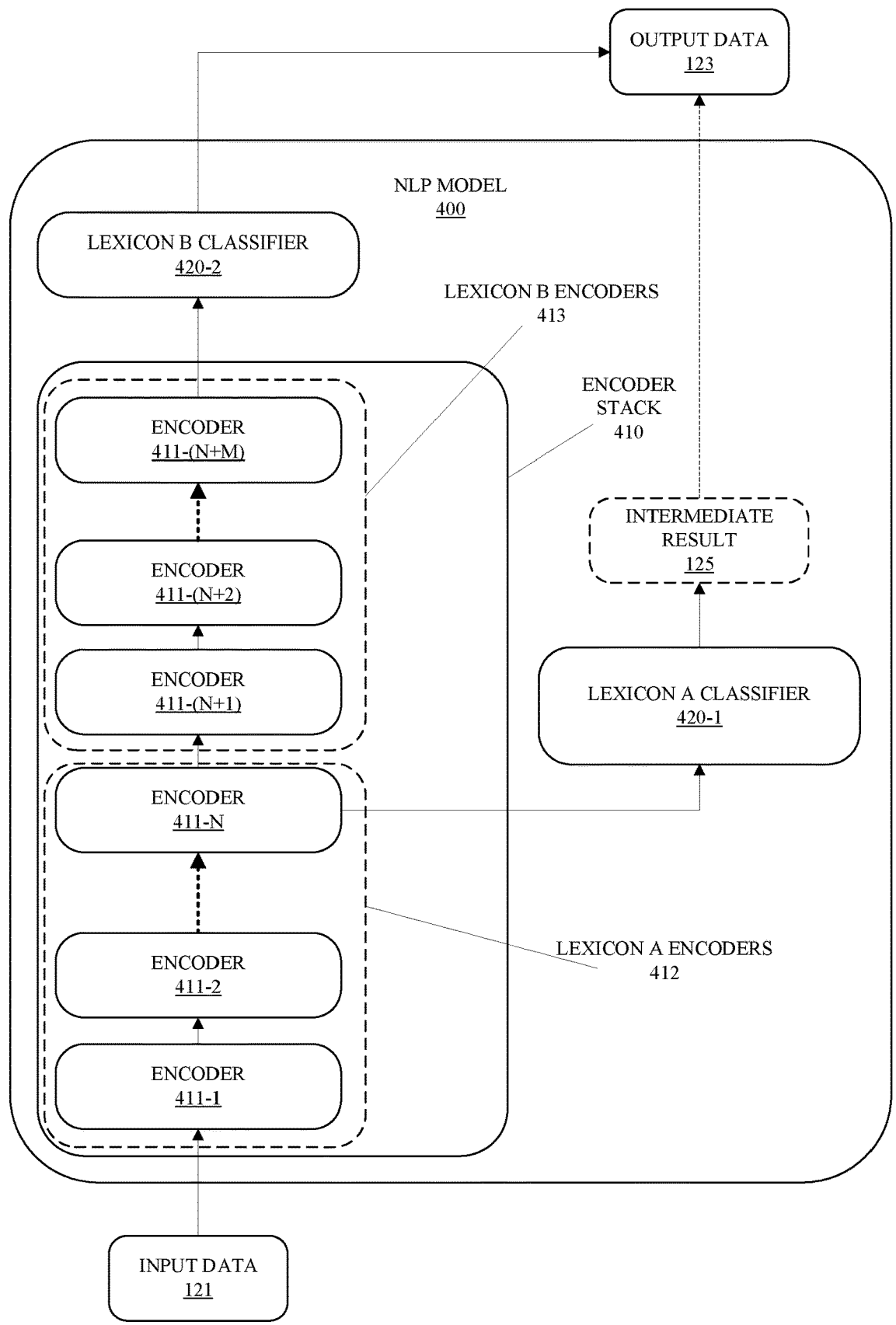
FIG. 4 illustrates an NLP model.

NLP model 140 can have a number of layers (e.g., refer to FIGS. 2 and 4). For example, NLP model 140 can have a number of encoder block layers, transformer block layers, or the like. Processor 110 can execute NLP model 140 to generate intermediate result 125 based on processing input data 121 using a first selection of layers (or first part of NLP model 140) and lexicon A 142. Processor 110, in executing instructions 122 and/or NLP model 140 can determine confidence 127 related to intermediate result 125. Said differently, confidence 127 can include an indication of a level of confidence with the accuracy of intermediate result. In some examples confidence 127 is generated by the NLP model 140 as part of generating intermediate result. In general, NLP model 140 is arranged to infer something (e.g., the NLP tasks) from input 121. Confidence 127 includes an indication in the "confidence" that the inference (e.g., generated output) is accurate. In some examples, confidence 127 can be based on a softmax prediction (e.g., neural network with softmax activation function, or the like).

Processor 110, in executing instructions 122 can determine whether to set intermediate result 125 as output 123 and to exit, or stop, processing NLP model 140 based on confidence 127 and threshold 129. For example, processor 110 in executing instructions 122 can compare (e.g., greater than comparison, greater than or equal to comparison, or the like) confidence 127 with threshold 129. Processor 110, in executing instructions 122, can set intermediate result 125 as output data 123 based on the comparison. For example, where the confidence 127 is greater than or greater than or equal to the threshold 129, the output data 123 can be set as the intermediate result 125. Additionally, processor 110, in executing instructions 122, can cause processing of NLP model 140 to cease (or exit) based on the comparison. For example, where the confidence 127 is greater than or greater than or equal to the threshold 129, processing of NLP model 140 can exit.

Conversely, processing of NLP model 140 can continue based on the comparison. For example, where the confidence 127 is not greater than or not greater than or equal to the threshold 129, processing of NLP model 140 can continue. That is, processor 110, in executing NLP model 140, can continue to process input data 121 to can generate output data 123 based in part on processing input data 121 through further layers of the NLP model 140 and lexicon B 144.

FIG. 2 illustrates an NLP model 200, which can be representative of NLP model 140, executed on computing device 100 in FIG. 1. NLP model 200 includes a number of processing layers 210 and classifiers 220. In general, layers 210 can comprise any of a variety of connected neural layers (e.g., encoders, decoders, transformers, or the like) arranged to operate on input data 121 to provide an NLP operation or task.

It is noted, that NLP model 200 can include any of a variety of types of layers as well as any number of layers. However, a limited number of layers are depicted in this figure for purposes of clarity. As depicted, NLP model 200 includes lexicon A processing layer(s) 210-1 (or initial processing layers) and lexicon B processing layer(s) 210-2 (or subsequent processing layers).

Classifiers 220 can be any of a variety of feed-forward neural layers arranged to generate output based on a language. Furthermore, classifiers 220 can generate a confidence (e.g., based on softmax, or the like) associated with the output generated by the classifier 220. In general, NLP model 200 can include a classifier for each vocabulary (or language) to which the NLP model 200 is arranged to operate on. Continuing with the example above where NLP model 140 is arranged to compute an NLP task using lexicon A 142 and lexicon B 144 (where lexicon A is a sub-set of lexicon B); NLP model 200 would include at least two classifiers 220. As depicted, NLP model 200 includes a lexicon A classifier 220-1 and a lexicon B classifier 220-2.

It is noted, that since lexicon A 142 is a sub-set of lexicon B 144, lexicon A classifier 220-1 will be smaller (e.g., have less dimensions or nodes) than lexicon B classifier 220-2. Said differently, since the size of the vocabulary of lexicon A 142 will be smaller than the vocabulary of lexicon B 144 (e.g., due to lexicon A 142 being a sub-set of lexicon B 144); thus classifiers 220 based on lexicon A 142 will naturally be smaller than classifiers 220 based on lexicon B 144.

Figure 3:
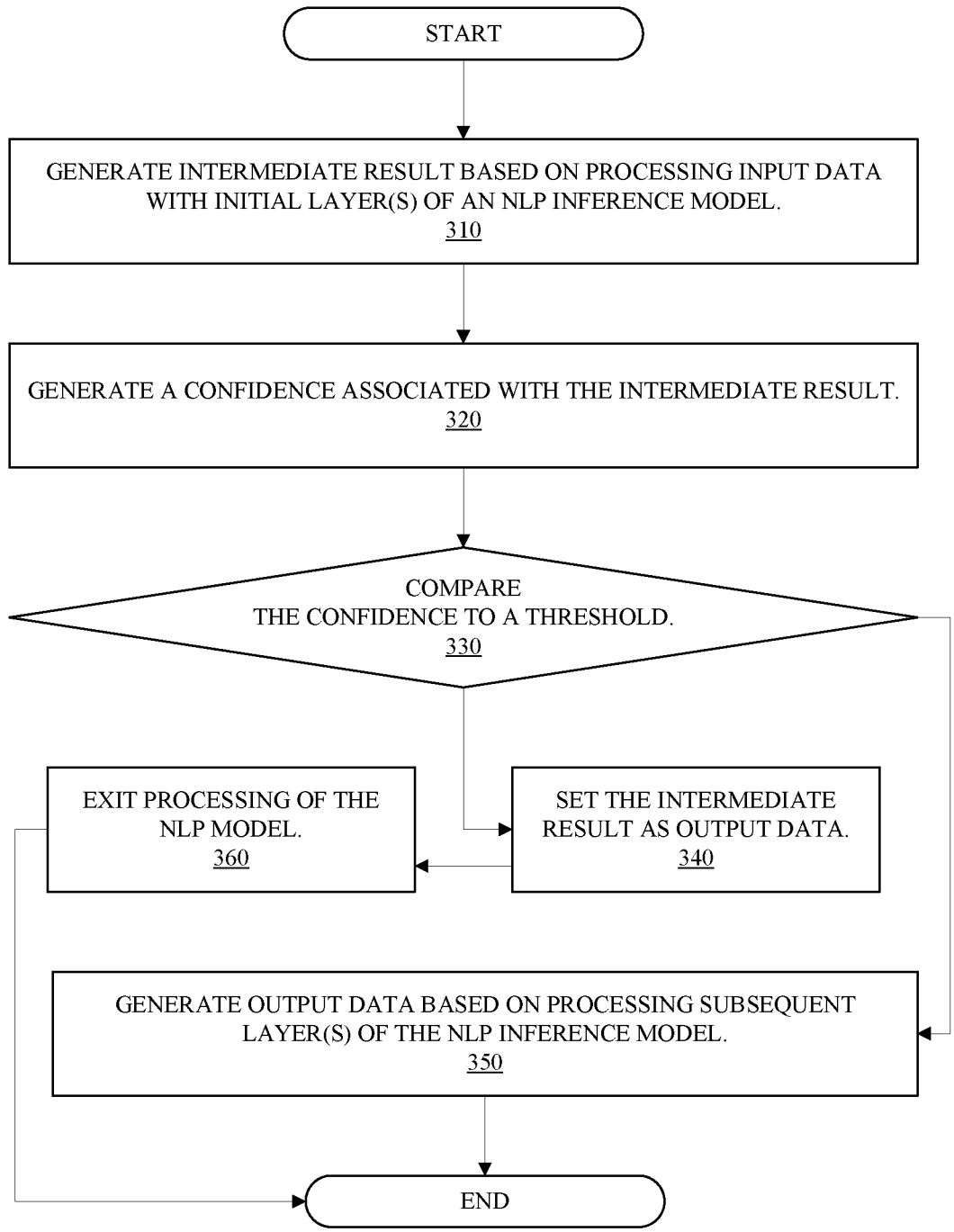
FIG. 3 illustrates a logic flow.

FIG. 3 illustrates a logic flow 300. The logic flow 300 may be representative of some or all the operations executed by one or more devices described herein. For example, logic flow 300 can be representative of operations performed by computing device 100. Logic flow 300 is described with reference to computing device 100 of FIG. 1 as well as NLP model 200 of FIG. 2. However, operations based on logic flow 300 could be implemented by a computing device different than that described here.

Logic flow 300 may begin at block 310 "generate intermediate result based on processing input data with initial layer(s) of an NLP inference model" where an intermediate result can be generated from processing input data through initial layer(s) of an NLP inference model. For example, intermediate result 125 can be generated by processing input data 121 through lexicon A processing layer(s) 210-1 of NLP model 200. As another example, processor 110 of computing device 100 could execute an NLP model (e.g., NLP model 140, NLP model 200, or the like) and can generate intermediate result 125 from processing input data 121 through initial layers (e.g., lexicon A processing layer(s) 210-1, or the like) and a classifier (e.g., lexicon A classifier 220-1, or the like) of the NLP model.

Continuing to block 320 "generate a confidence associated with the intermediate result" a confidence associated with the intermediate result can be generated. For example, lexicon A classifier 220-1 can generate confidence 127 associated with the output from lexicon A processing layers 210-1 and lexicon A classifier 220-1 (e.g., intermediate result 125, or the like). As another example, processor 110 of computing device 100 can execute lexicon A classifier 220-1 of NLP model 200 to determine a confidence of intermediate result 125 and store an indication of the determined confidence as confidence 127.

Continuing to decision block 330 "compare the confidence to a threshold" the confidence generated at block 320 can be compared to a threshold. For example, confidence 127 can be compared (e.g., greater than, greater than or equal too, etc.) to threshold 129. As another example, processor 110 of computing device 100 can execute instructions to compare confidence 127 to threshold 129. With some implementations, confidence 127 can be represented as a percent. In such cases, threshold 129 can also be represented as a percent and can indicate an acceptable level at which the intermediate result may be set as the output. For example, threshold 129 can be 80%, 85% 90%, 95%, etc. It is noted, that the threshold itself may be based in part on the particular NLP task and/or the application with a "higher" threshold set for easier tasks, more security conscious tasks, or the like.

From decision block 330, logic flow 300 can continue to either block 340 or block 350. For example, based on the comparison at block 330 (e.g., based on a determination that the confidence is greater than the threshold, greater than or equal to the threshold, or the like) logic flow can continue from decision block 330 to block 340. Alternatively, based on the comparison at block 330 (e.g., based on a determination that the confidence is not greater than the threshold, not greater than or equal to the threshold, or the like) logic flow 300 can continue from decision block 330 to block 350.

At block 340 "set the intermediate result as output data" the intermediate result can be set as the output data. For example, intermediate result 125 can be set as output data 123. As another example, processor 110 in executing instructions 122, can set intermediate result 125 as output data 123. From block 340, logic flow can continue to block 360 "exit processing of the NLP model" where processing (or compute operations related to) the NLP model can be ceased. For example, processing of the NLP model 200 itself can be exited, thereby bypassing processing of lexicon B processing layer(s) 210-2. As another example, processor 110 can exit processing of the NLP model (e.g., NLP model 140, NLP model 200, or the like).

At block 350 "generate output data based on processing subsequent layer(s) of the NLP inference model" output data can be generated by processing subsequent layer (e.g., layer subsequent to those processed at block 310, or the like) of the NLP inference model and a second classifier. For example, output data 123 can be generated by continuing to process input data 121 through lexicon B processing layer(s) 210-2 of NLP model 200 and lexicon B classifier 220-2. As another example, processor 110 of computing device 100 could continue to execute the NLP model (e.g., NLP model 140, NLP model 200, or the like) and can generate output data 123 from continuing to process input data 121 through subsequent layers (e.g., lexicon B processing layer(s) 210-2, or the like) and lexicon B classifiers 220-2 of the NLP model 200. From blocks 350 and 360, logic flow 300 can end.

FIG. 4 illustrates an NLP model 400, which can be representative of NLP model 140, executed on computing device 100 in FIG. 1. NLP model 400 includes an encoder stack 410 and a number of classifiers 420. It is noted, the present disclosure could be implemented with an NLP model comprising an encoder/decoder stack, or a transformer stack. However, NLP model 400 is depicted including encoder stack 410 only for purposes of convenience.

Encoder stack 410 includes a number of encoders 411, where each encoder is arranged to receive input data 121. In some examples, input data 121 can comprise indications of a number of tokens (e.g., words, letters, numbers, symbols, or the like) with which NLP model 400 is arranged to process an NLP task for. Further, the tokens can correspond to vocabulary of a language (e.g., lexicon B). Each encoder 411 in the encoder stack 410 can include a self-attention layer and a feed-forward neural network layer. During operation, encoders 411 can receive an input vector (or matrix) of tokens and process the tokens to generate an output vector (or matrix) of tokens, which is processed by the next encoder 411 in the chain of encoder stack 410.

Classifiers 420 are arranged to receive output from an encoder 411 in the encoder stack 410 and to generate an output along with a confidence associated with the output based on a vocabulary or a language. Here, confidence can be representative of a confidence in the correctness of the output. For example, classifiers 420 can comprise a feed-forward neural network including a softmax layer arranged to output a probability that the output from the classifier is correct. In some examples, the softmax layer of the classifiers 420 includes nodes for each of the possible outputs and is scaled based in the embedding size of the encoder. That is, the classifier 420 can comprise a matrix of neural network nodes in the size [embedding size, vocabulary size]. Thus, for large vocabularies, the size of the classifier can be substantial. As a specific example, some embedding sizes for common NLP models are 512 embeddings with a vocabulary of 33,000. Thus, the classifier will have a size of [512, 33,000]. In some cases, the embedding size can be 2048 and the vocabulary can be 150,000. Thus, the classifier 420 will have a size of [2048, 150,000]. As can be appreciated, compute requirements for a classifier of this size can be substantial.

The present disclosure provides multiple classifiers, one for each language. For example, using the example of lexicon A and lexicon B provided above, the first classifier (e.g., lexicon A classifier 420-1) will have a size of [embedding dimensions, vocabulary size of lexicon A 142]. Likewise, the second classifier (e.g., lexicon B classifier 420-2) will have a size of [embedding dimensions, vocabulary size of lexicon B 144]. Using the English language as an example, the English language has a vocabulary of greater than 170,000 words. However, there are a number of words in the vocabulary that are "commonly" used. Said differently, a sub-set of the 170,000+ vocabulary of the English language are used more frequently than the rest. Using English as an example again, the 10 most commonly used words in the English vocabulary account for 25% of all occurrences of words used in the English language. Accordingly, a classifier of size [embedding dimensions, 10] may classify commonly used vocabulary items in the English language while a classifier of size [embedding dimensions, 170,000+] would need to be used to classify every item in the vocabulary.

Figure 5:
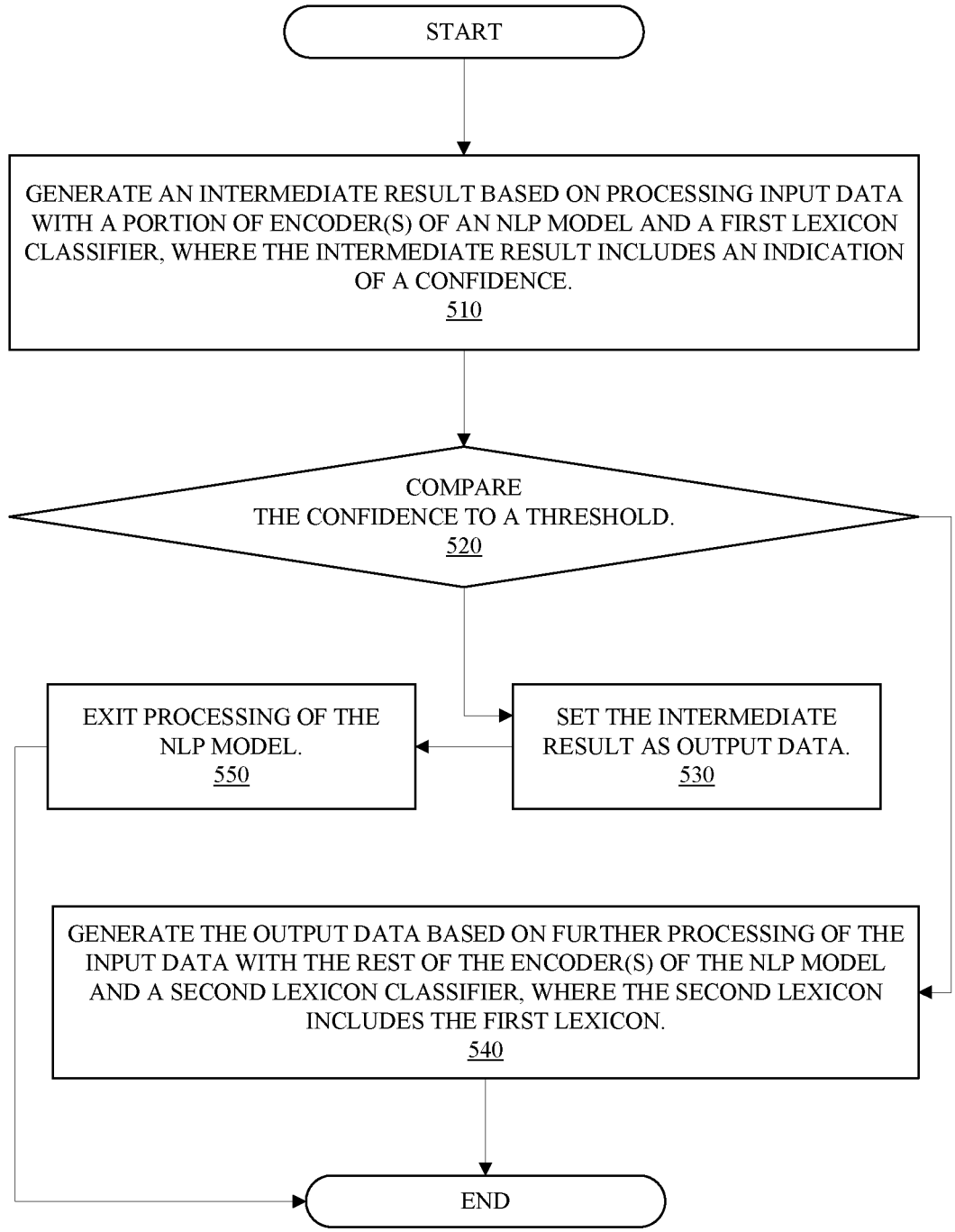
FIG. 5 illustrates a logic flow.

FIG. 5 illustrates a logic flow 500. The logic flow 500 may be representative of some or all of the operations executed by one or more devices described herein. For example, logic flow 500 can be representative of operations performed by computing device 100. Logic flow 500 is described with reference to computing device 100 of FIG. 1 as well as NLP model 400 of FIG. 4. However, operations based on logic flow 500 could be implemented by a computing device different than that described here.

Logic flow 500 may begin at block 510 "generate an intermediate result based on processing input data with a portion of encoder(s) of an NLP model and a first language classifier, where the intermediate result includes an indication of a confidence" where an intermediate result and a confidence can be generated from processing input data through initial encoder(s) of an encoder stack in an NLP inference model and a first language classifier. For example, intermediate result 125 and confidence 129 can be generated by processing input data 121 through encoders 411-1 through 411-N and lexicon A classifier 420-1. As another example, processor 110 of computing device 100 could execute NLP model 400 to generate intermediate result 125 and confidence 129 from processing input data 121 by processing input data 121 through encoders 411-1 to 411-N and lexicon A classifier 420-1.

Continuing to decision block 520 "compare the confidence to a threshold" the confidence generated as part of the intermediate result at block 510 can be compared to a threshold. For example, confidence 127 can be compared (e.g., greater than, greater than or equal too, etc.) to threshold 129. As another example, processor 110 of computing device 100 can execute instructions 122 to compare confidence 127 to threshold 129.

From decision block 520, logic flow 500 can continue to either block 530 or block 540. For example, based on the comparison at block 520 (e.g., based on a determination that the confidence is greater than the threshold, greater than or equal to the threshold, or the like) logic flow can continue from decision block 520 to block 530. Alternatively, based on the comparison at block 520 (e.g., based on a determination that the confidence is not greater than the threshold, not greater than or equal to the threshold, or the like) logic flow 500 can continue from decision block 520 to block 540.

At block 530 "set the intermediate result as output data" the intermediate result can be set as the output data. For example, intermediate result 125 can be set as output data 123. As another example, processor 110 in executing instructions 122, can set intermediate result 125 as output data 123. From block 530, logic flow 500 can continue to block 550 "exit processing of the NLP model" where processing (or compute operations related to) the NLP model can be ceased. For example, processing of the NLP model 400 itself can be exited, thereby bypassing processing of lexicon B encoders 413 (e.g., encoder 411-(N+1) through encoder 411-(N+M), or the like) and lexicon B classifier 420-2. As another example, processor 110 can exit processing of the NLP model 400.

At block 540 "generate the output data based on further processing of the input data with the rest of the encoder(s) of the NLP model and a second language classifier, where the second language includes the first language" output data can be generated by processing input data through subsequent encoders of the encoder stack of the NLP model and a second language classifier. For example, output data 123 can be generated by continuing to process input data 121 through encoders 411-(N+1) to 411-(N+M) and lexicon B classifier 420-2. As another example, processor 110 of computing device 100 could continue to execute the NLP model 400 and can generate output data 123 from continuing to process input data 121 through lexicon B encoders 413 (e.g., encoders 411-(N+1) to 411-(N+M)) and lexicon B classifier 420-2 of the NLP model 400. From blocks 540 and 550, logic flow 500 can end.

Figure 6:
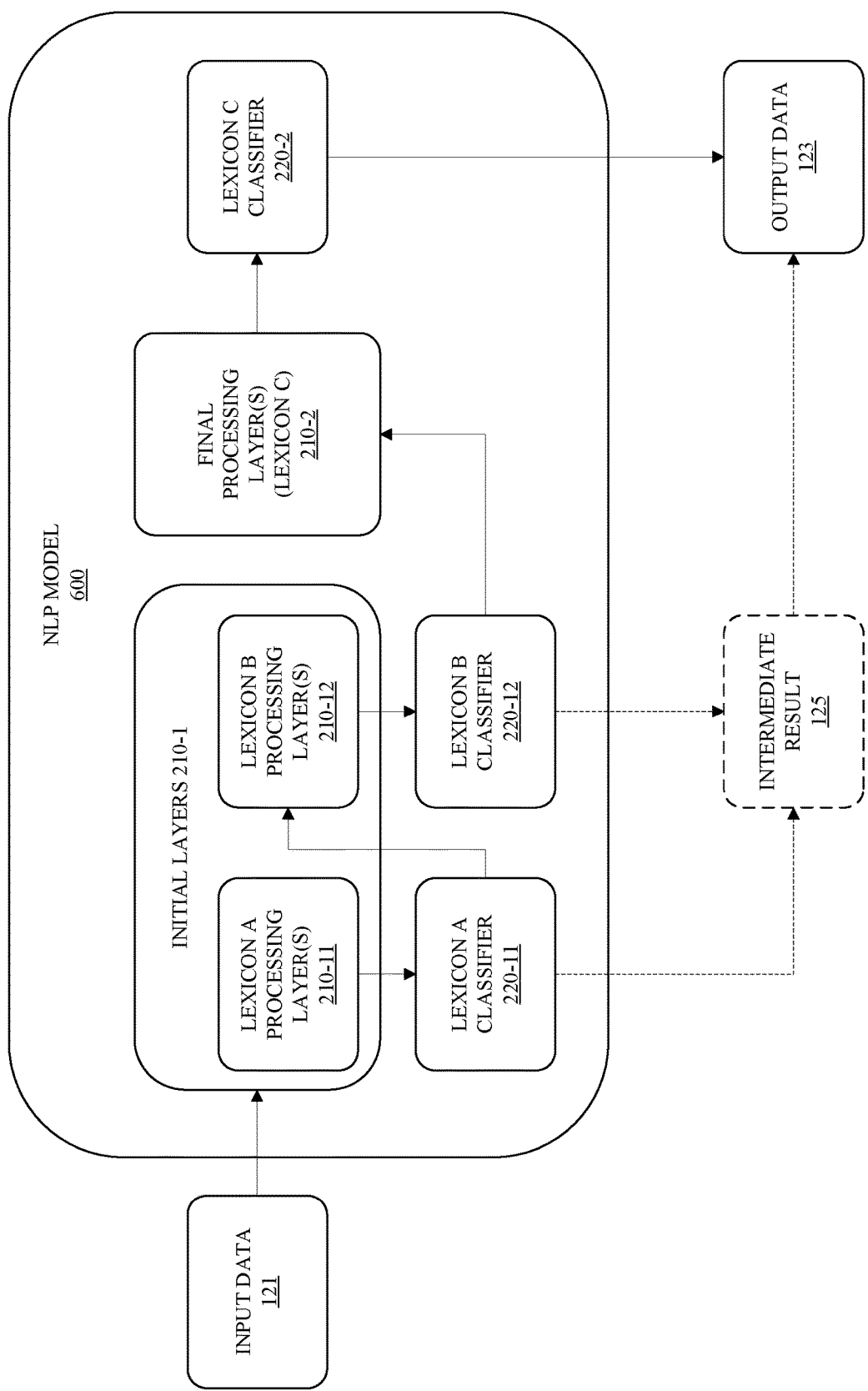
FIG. 6 illustrates an NLP model.

With some examples, multiple "early exit" points can be provided. FIG. 6 illustrates an NLP model 600, which can be representative of NLP model 140, executed on computing device 100 in FIG. 1, and which contains multiple early exit points. NLP model 600 includes a number of processing layers 210 and classifiers 220. In general, layers 210 can comprise any of a variety of connected neural layers (e.g., encoders, decoders, transformers, or the like) arranged to operate on input data 121 to provide an NLP operation or task.

It is noted, that NLP model 600 can include any of a variety of types of layers as well as any number of layers. Generally, the layers can be arranged to perform an NLP task for a particular lexicon. Here, a limited number of layers are depicted in this figure for purposes of clarity. For example, NLP model 600 includes initial processing layers 210-1 and final processing layers 210-2. As described herein, each group of layer(s) can be arranged to operate on a lexicon (or perform an NLP task for a particular lexicon). For example, initial processing layers 210-1 include lexicon A processing layers 210-11 and lexicon B processing layers 210-12.

In this example lexicon A and lexicon B can be mutually exclusive; lexicon A and lexicon B could share a similar lexicon but be different; or lexicon A could be a sub-set of lexicon B as described above. Lexicon C, however, includes both lexicon A and lexicon B. That is, lexicon A and lexicon B are sub-sets of lexicon C.

Classifiers 220 can be any of a variety of feed-forward neural layers arranged to generate output based on a language. Furthermore, classifiers 220 can generate a confidence (e.g., based on softmax, or the like) associated with the output generated by the classifier 220. In general, NLP model 600 can include multiple classifiers initial classifies 220-1 and a final classifier 220-2. Said differently, NLP model 600 can include multiple initial classifiers 220, which may be used to provide for an "early exit" of processing of the NLP model 600 prior to completion of computing of all the layers 210. For example, NLP model 600 is depicted including a lexicon A classifier 220-11 and a lexicon B classifier 220-12. During operation, intermediate result 125 can be generated by initial classifier 220-11 and processing of NLP model 600 could be aborted based on a comparison of a confidence of the intermediate result 125 to the threshold 129. Based on the comparison, output data 123 can be set based on the intermediate result 125 and processing of NLP model 600 can be aborted early; or processing could continue as described herein. However, in the case of multiple initial classifiers 220, processing can return to the initial layers (e.g., in the case of further initial processing layers and further initial classifiers 220). Alternatively, where computing operations have been executed on all initial processing layer 210 and initial classifiers 220, processing can continue to the final processing layers 210 and final classifier 220.

Since lexicon A and lexicon C are sub-sets of lexicon B, lexicon A classifier 220-11 and lexicon C classifier 220-12 will be smaller (e.g., have less dimensions or nodes) than lexicon B classifier 220-2. Said differently, since the size of the vocabulary of lexicon A and lexicon C will be smaller than the vocabulary of lexicon B (e.g., due to lexicon A and lexicon C being a sub-sets of lexicon B); classifiers 220 based on lexicon A and lexicon C will naturally be smaller than classifiers 220 based on lexicon B.

Here, initial classifiers 220-11 and 220-12 can be used to provide an "early exit" feature for NLP model 600.

Figure 7:
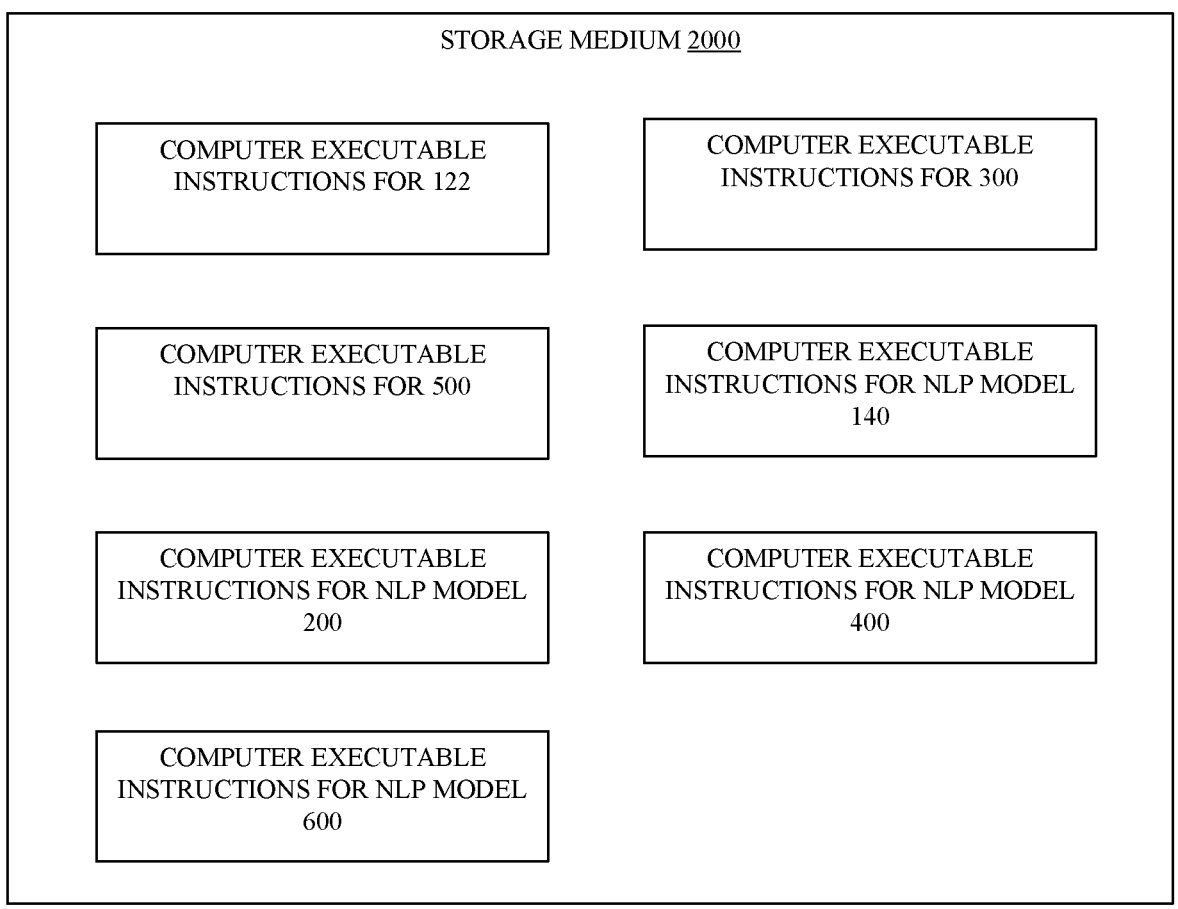
FIG. 7 illustrates a storage medium.

FIG. 7 illustrates an embodiment of a storage medium 2000. Storage medium 2000 may comprise any non-transitory computer-readable storage medium or machine-readable storage medium, such as an optical, magnetic or semiconductor storage medium. In various embodiments, storage medium 2000 may comprise an article of manufacture. In some embodiments, storage medium 2000 may store computer-executable instructions, such as computer-executable instructions to implement one or more of techniques, logic flows, or operations described herein, such as with respect to 300 and/or 500 of FIGS. 3 and 5. The storage medium 2000 may further store computer-executable instructions for instructions 122, NLP model 140, NLP model 200, NLP model 400, and/or NLP model 600. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
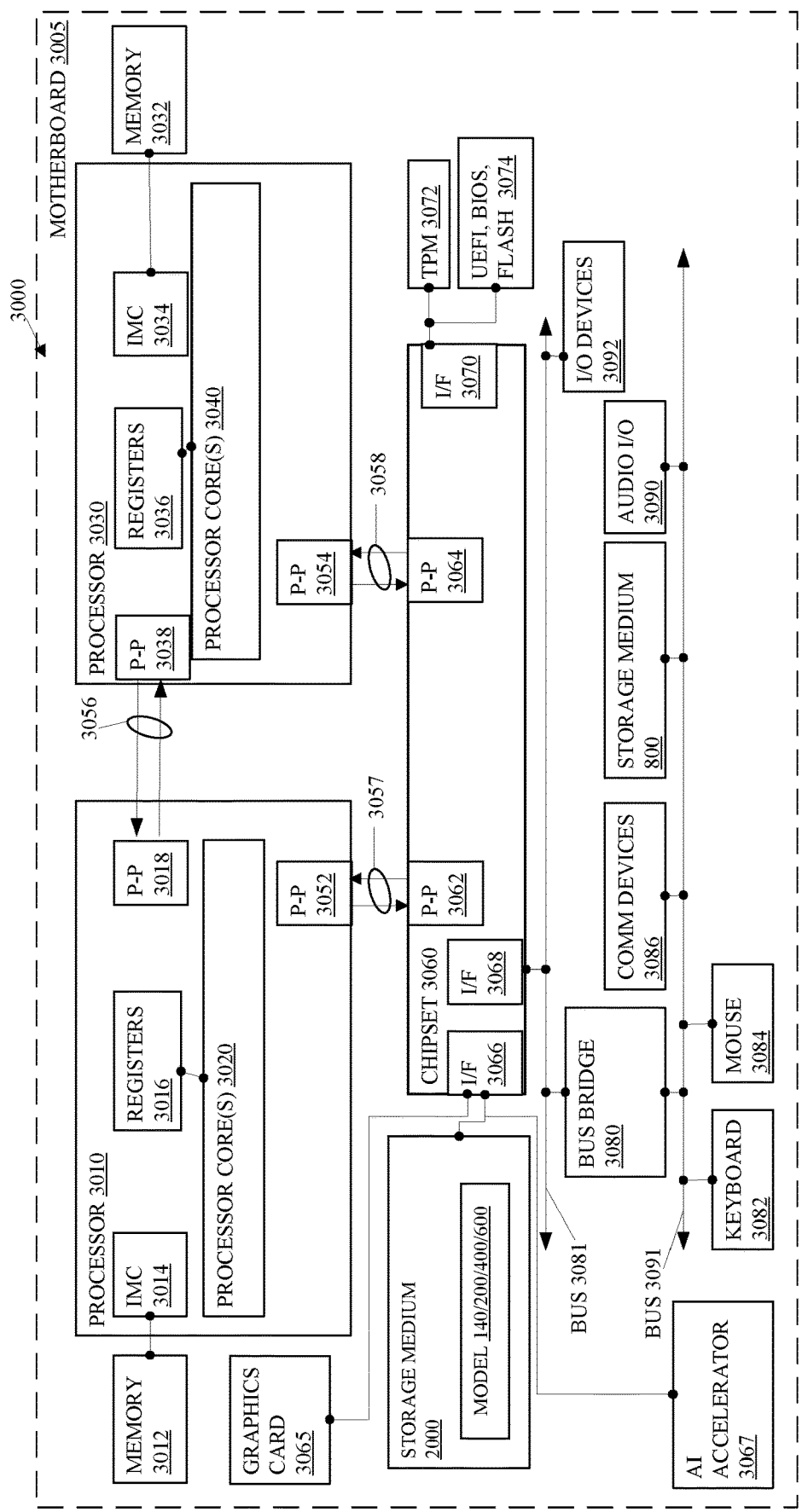
FIG. 8 illustrates a computing system.

FIG. 8 illustrates an embodiment of a system 3000. The system 3000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 3000 may have a single processor with one core or more than one processor. Note that the term "processor" refers to a processor with a single core or a processor package with multiple processor cores. In at least one embodiment, the computing system 3000 is representative of the computing device 100. More generally, the computing system 3000 is configured to implement all logic, systems, logic flows, methods, apparatuses, and functionality described herein with reference to FIGS. 1-7.

Any functionality described in this application is intended to refer to a structure (e.g., circuitry, or the like) of a computer-related entity arranged to implement the described functionality. Structural examples of such a computer-related entity are provided by the exemplary system 3000. For example, such structure can be, but is not limited to, a processor, a processor executing a process, a hard disk drive, multiple storage drives (of optical and/or magnetic storage medium), a thread of execution, a program, and/or a computer. Further, the structure(s) may be communicatively coupled to each other by various types of communications media to coordinate operations. The coordination may involve the uni-directional or bi-directional exchange of information. For instance, the structure may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 3000 comprises a motherboard 3005 for mounting platform components. The motherboard 3005 is a point-to-point interconnect platform that includes a first processor 3010 and a second processor 3030 coupled via a point-to-point interconnect 3056 such as an Ultra Path Interconnect (UPI). In other embodiments, the system 3000 may be of another bus architecture, such as a multi-drop bus. Furthermore, each of processors 3010 and 3030 may be processor packages with multiple processor cores including processor core(s) 3020 and 3040, respectively. While the system 3000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 3010 and the chipset 3060. Some platforms may include additional components and some platforms may only include sockets to mount the processors and/or the chipset.

The processors 3010, 3020 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processors 3010, 3020.

The first processor 3010 includes an integrated memory controller (IMC) 3014 and point-to-point (P-P) interfaces 3018 and 3052. Similarly, the second processor 3030 includes an IMC 3034 and P-P interfaces 3038 and 3054. The IMC's 3014 and 3034 couple the processors 3010 and 3030, respectively, to respective memories, a memory 3012 and a memory 3032. The memories 3012 and 3032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 3012 and 3032 locally attach to the respective processors 3010 and 3030. In other embodiments, the main memory may couple with the processors via a bus and shared memory hub.

The processors 3010 and 3030 comprise caches coupled with each of the processor core(s) 3020 and 3040, respectively. The processor cores 3020, 3040 may further include memory management logic circuitry (not pictured) which may represent circuitry configured to implement the functionality of logic flow 300, logic flow 500, and/or NLP models 140/200/400/600 in the processor core(s) 3020, 3040, or may represent a combination of the circuitry within a processor and a medium to store all or part of NLP models 140/200/400/600 in memory such as cache, the memory 3012, buffers, registers, and/or the like. The functionality of logic flow 300, logic flow 500, and/or MLP model 140/200/400 may reside in whole or in part as code in a memory such as the storage medium 2000 attached to the processors 3010 and/or 3030 via a chipset 3060. The functionality of logic flow 300, logic flow 500, and/or NLP model 140/200/400/600 may also reside in whole or in part in memory such as the memory 3012 and/or a cache of the processor. Furthermore, the functionality of logic flow 300, logic flow 500, and/or NLP model 140/200/400/600 may also reside in whole or in part as circuitry within the processor 3010 and may perform operations, e.g., within registers or buffers such as the registers 3016 within the processors 3010, 3030, or within an instruction pipeline of the processors 3010, 3030. Further still, the functionality of logic flow 300, logic flow 500, and/or NLP model 140/200/400/600 may be integrated a processor of the hardware accelerator for performing inference using a DNN.

As stated, more than one of the processors 3010 and 3030 may comprise the functionality of logic flow 300, logic flow 500, and/or NLP model 140/200/400, such as the processor 3030 and/or an artificial intelligence (AI) accelerator 3067 coupled with the chipset 3060 via an interface (I/F) 3066. The I/F 3066 may be, for example, a Peripheral Component Interconnect-enhanced (PCI-e).

The first processor 3010 couples to a chipset 3060 via P-P interconnects 3052 and 3062 and the second processor 3030 couples to a chipset 3060 via P-P interconnects 3054 and 3064. Direct Media Interfaces (DMIs) 3057 and 3058 may couple the P-P interconnects 3052 and 3062 and the P-P interconnects 3054 and 3064, respectively. The DMI may be a high-speed interconnect that facilitates, e.g., eight Giga Transfers per second (GT/s) such as DMI 3.0. In other embodiments, the processors 3010 and 3030 may interconnect via a bus.

The chipset 3060 may comprise a controller hub such as a platform controller hub (PCH). The chipset 3060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 3060 may comprise more than one controller hub such as a chipset with a memory controller hub, a graphics controller hub, and an input/output (I/O) controller hub.

In the present embodiment, the chipset 3060 couples with a trusted platform module (TPM) 3072 and the UEFI, BIOS, Flash component 3074 via an interface (I/F) 3070. The TPM 3072 is a dedicated microcontroller designed to secure hardware by integrating cryptographic keys into devices. The UEFI, BIOS, Flash component 3074 may provide pre-boot code.

Furthermore, chipset 3060 includes an I/F 3066 to couple chipset 3060 with a high-performance graphics engine, graphics card 3065. In other embodiments, the system 3000 may include a flexible display interface (FDI) between the processors 3010 and 3030 and the chipset 3060. The FDI interconnects a graphics processor core in a processor with the chipset 3060.

Various I/O devices 3092 couple to the bus 3081, along with a bus bridge 3080 which couples the bus 3081 to a second bus 3091 and an I/F 3068 that connects the bus 3081 with the chipset 3060. In one embodiment, the second bus 3091 may be a low pin count (LPC) bus. Various devices may couple to the second bus 3091 including, for example, a keyboard 3082, a mouse 3084, communication devices 3086 and the storage medium 700 that may store computer executable code as previously described herein. Furthermore, an audio I/O 3090 may couple to second bus 3091. Many of the I/O devices 3092, communication devices 3086, and the storage medium 800 may reside on the motherboard 3005 while the keyboard 3082 and the mouse 3084 may be add-on peripherals. In other embodiments, some or all the I/O devices 3092, communication devices 3086, and the storage medium 800 are add-on peripherals and do not reside on the motherboard 3005.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The following examples pertain to further embodiments, from which numerous permutations and configurations will be apparent.

Example 1

An apparatus, comprising: a processor; and memory storing instructions and a natural language processing (NLP) inference model, the instructions when executed by the processor cause the processor to: generate, via the NLP inference model, an intermediate result and a confidence associated with the intermediate result; compare the confidence to a threshold; and based on the comparison, either: generate an output based on the intermediate result and cease computation via the NLP inference mode; or generate the output via the NLP inference model.

Example 2

The apparatus of example 1, the memory storing instructions, which when executed by the processor cause the processor to: determine whether the confidence is greater than or equal to the threshold; and generate the output based on the intermediate result and cease computation via the NLP inference mode based on a determination that the confidence is greater than or equal to the threshold.

Example 3

The apparatus of example 2, the memory storing instructions, which when executed by the processor cause the processor to generate the output via the NLP inference model based on a determination that the confidence is not greater than or equal to the threshold.

Example 4

The apparatus of example 1, the NLP model comprising a plurality of encoders, a first classifier associated with a first lexicon and a second classifier associated with a second lexicon, where the first lexicon is a sub-set of the second lexicon, the memory storing instructions, which when executed by the processor cause the processor to derive the intermediate result and the confidence based on a first portion of the plurality of encoders and the first classifier.

Example 5

The apparatus of example 4, the memory storing instructions, which when executed by the processor cause the processor to derive the output based the plurality of the encoders and the second classifier.

Example 6

The apparatus of example 4, the memory storing instructions, which when executed by the processor cause the processor to not process a second portion of the plurality of encoders to cease computation via the NLP inference model, where the second portion of the plurality of encoders is mutually exclusive of the first portion of the plurality of encoders.

Example 7

The apparatus of example 4, wherein the second lexicon comprises a vocabulary of a plurality of tokens and the first lexicon comprises a vocabulary including a sub-set of the plurality of tokens.

Example 8

The apparatus of example 7, wherein the vocabulary of the first lexicon is selected based in part on a statistical measurement of usage of the tokens of the vocabulary of the second lexicon.

Example 9

The apparatus of example 1, wherein the processor is an artificial intelligence (AI) accelerator.

Example 10

A non-transitory computer-readable storage medium, comprising instructions that when executed by a processor, cause the processor to: generate, via an NLP inference model, an intermediate result and a confidence associated with the intermediate result; compare the confidence to a threshold; and based on the comparison, either: generate an output based on the intermediate result and cease computation via the NLP inference mode; or generate the output via the NLP inference model.

Example 11

The non-transitory computer-readable storage medium of example 10, comprising instructions that when executed by the processor, cause the processor to: determine whether the confidence is greater than or equal to the threshold; and generate the output based on the intermediate result and cease computation via the NLP inference mode based on a determination that the confidence is greater than or equal to the threshold.

Example 12

The non-transitory computer-readable storage medium of example 11, comprising instructions that when executed by the processor, cause the processor to generate the output via the NLP inference model based on a determination that the confidence is not greater than or equal to the threshold.

Example 13

The non-transitory computer-readable storage medium of example 10, the NLP model comprising a plurality of encoders, a first classifier associated with a first lexicon and a second classifier associated with a second lexicon, where the first lexicon is a sub-set of the second lexicon, the instructions when executed by the processor cause the processor to derive the intermediate result and the confidence based on a first portion of the plurality of encoders and the first classifier.

Example 14

The non-transitory computer-readable storage medium of example 13, comprising instructions that when executed by the processor, cause the processor to derive the output based the plurality of the encoders and the second classifier.

Example 15

The non-transitory computer-readable storage medium of example 13, comprising instructions that when executed by the processor, cause the processor to not process a second portion of the plurality of encoders to cease computation via the NLP inference model, where the second portion of the plurality of encoders is mutually exclusive of the first portion of the plurality of encoders.

Example 16

The non-transitory computer-readable storage medium of example 13, wherein the second lexicon comprises a vocabulary of a plurality of tokens and the first lexicon comprises a vocabulary including a sub-set of the plurality of tokens.

Example 17

The non-transitory computer-readable storage medium of example 16, wherein the vocabulary of the first lexicon is selected based in part on a statistical measurement of usage of the tokens of the vocabulary of the second lexicon.

Example 18

A computer-implemented method, comprising: generating, via an NLP inference model, an intermediate result and a confidence associated with the intermediate result; comparing the confidence to a threshold; and based on the comparison, either: generating an output based on the intermediate result and cease computation via the NLP inference mode; or generating the output via the NLP inference model.

Example 19

The computer-implemented method of example 18, comprising: determining whether the confidence is greater than or equal to the threshold; and generating the output based on the intermediate result and cease computation via the NLP inference mode based on a determination that the confidence is greater than or equal to the threshold.

Example 20

The computer-implemented method of example 19, comprising generating the output via the NLP inference model based on a determination that the confidence is not greater than or equal to the threshold.

Example 21

The computer-implemented method of example 18, the NLP model comprising a plurality of encoders, a first classifier associated with a first lexicon and a second classifier associated with a second lexicon, where the first lexicon is a sub-set of the second lexicon, the method comprising: deriving the intermediate result and the confidence based on a first portion of the plurality of encoders and the first classifier; and

Example 22

The computer-implemented method of example 21, comprising deriving the output based the plurality of the encoders and the second classifier.

Example 23

The computer-implemented method of example 20, comprising not processing a second portion of the plurality of encoders to cease computation via the NLP inference model, where the second portion of the plurality of encoders is mutually exclusive of the first portion of the plurality of encoders.

Example 24

The computer-implemented method of example 19, wherein the second lexicon comprises a vocabulary of a plurality of tokens and the first lexicon comprises a vocabulary including a sub-set of the plurality of tokens.

Example 25

The computer-implemented method of example 24, wherein the vocabulary of the first lexicon is selected based in part on a statistical measurement of usage of the tokens of the vocabulary of the second lexicon.

Example 26

An apparatus, comprising means arranged to implement the function of any one of examples 18 to 25.

Example 27

A system comprising: an artificial intelligence (AI) accelerator; and memory coupled to the AI accelerator, the memory storing instructions and a natural language processing (NLP) inference model, the instructions when executed by the AI accelerator cause the AI accelerator to: generate, via the NLP inference model, an intermediate result and a confidence associated with the intermediate result; compare the confidence to a threshold; and based on the comparison, either: generate an output based on the intermediate result and cease computation via the NLP inference mode; or generate the output via the NLP inference model.

Example 28

The system of example 27, the memory storing instructions, which when executed by the AI accelerator cause the AI accelerator to: determine whether the confidence is greater than or equal to the threshold; and generate the output based on the intermediate result and cease computation via the NLP inference mode based on a determination that the confidence is greater than or equal to the threshold.

Example 29

The apparatus of example 28, the memory storing instructions, which when executed by the AI accelerator cause the AI accelerator to generate the output via the NLP inference model based on a determination that the confidence is not greater than or equal to the threshold.

Example 30

The apparatus of example 27, the NLP model comprising a plurality of encoders, a first classifier associated with a first lexicon and a second classifier associated with a second lexicon, where the first lexicon is a sub-set of the second lexicon, the memory storing instructions, which when executed by the AI accelerator cause the AI accelerator to derive the intermediate result and the confidence based on a first portion of the plurality of encoders and the first classifier.

Example 31

The apparatus of example 30, the memory storing instructions, which when executed by the AI accelerator cause the AI accelerator to derive the output based the plurality of the encoders and the second classifier.

Example 32

The apparatus of example 30, the memory storing instructions, which when executed by the AI accelerator cause the AI accelerator to not process a second portion of the plurality of encoders to cease computation via the NLP inference model, where the second portion of the plurality of encoders is mutually exclusive of the first portion of the plurality of encoders.

Example 33

The apparatus of example 30, wherein the second lexicon comprises a vocabulary of a plurality of tokens and the first lexicon comprises a vocabulary including a sub-set of the plurality of tokens.

Example 34

The apparatus of example 33, wherein the vocabulary of the first lexicon is selected based in part on a statistical measurement of usage of the tokens of the vocabulary of the second lexicon.

What is claimed is:
1. An apparatus, comprising:
a processor; and
memory storing instructions and a natural language processing (NLP) inference model comprising a plurality of encoders, a first classifier associated with a first lexicon and a second classifier associated with a second lexicon, where the first lexicon is a sub-set of the second lexicon, the instructions when executed by the processor cause the processor to execute the NLP inference model on a single device and to:
generate, via the NLP inference model, an intermediate result and a confidence associated with the intermediate result based on a first portion of the plurality of encoders and the first classifier;
compare the confidence to a threshold; and
based on the comparison, either:
generate an output based on the intermediate result from the first portion of the plurality of encoders and the first classifier and cease computation via the NLP inference model; or
generate the output via the NLP inference model based on a second portion of the plurality of encoders and the second classifier, each encoder of the second portion of the plurality of encoders different from the first portion of the plurality of encoders.

2. The apparatus of claim 1, the memory storing instructions, which when executed by the processor cause the processor to:
determine whether the confidence is greater than or equal to the threshold; and
generate the output based on the intermediate result and cease computation via the NLP inference model based on a determination that the confidence is greater than or equal to the threshold.

3. The apparatus of claim 2, the memory storing instructions, which when executed by the processor cause the processor to generate the output via the NLP inference model based on a determination that the confidence is not greater than or equal to the threshold.

4. The apparatus of claim 1, the memory storing instructions, which when executed by the processor cause the processor to derive the output based the plurality of the encoders and the second classifier.

5. The apparatus of claim 1, the memory storing instructions, which when executed by the processor cause the processor to not process a second portion of the plurality of encoders to cease computation via the NLP inference model, where the second portion of the plurality of encoders is mutually exclusive of the first portion of the plurality of encoders.

6. The apparatus of claim 1, wherein the second lexicon comprises a vocabulary of a plurality of tokens and the first lexicon comprises a vocabulary including a sub-set of the plurality of tokens.

7. The apparatus of claim 6, wherein the vocabulary of the first lexicon is selected based in part on a statistical measurement of usage of the tokens of the vocabulary of the second lexicon.

8. The apparatus of claim 1, wherein the processor is an artificial intelligence (AI) accelerator.

9. A non-transitory computer-readable storage medium, comprising instructions that when executed by a processor, cause the processor to:
generate, via an NLP inference model comprising a plurality of encoders, a first classifier associated with a first lexicon and a second classifier associated with a second lexicon, where the first lexicon is a sub-set of the second lexicon, an intermediate result and a confidence associated with the intermediate result based on a first portion of the plurality of encoders and the first classifier, wherein the NLP inference model is executed on a single device;
compare the confidence to a threshold; and
based on the comparison, either:
generate an output based on the intermediate result from the first portion of the plurality of encoders and the first classifier and cease computation via the NLP inference model; or
generate the output via the NLP inference model based on a second portion of the plurality of encoders and the second classifier, each encoder of the second portion of the plurality of encoders different from the first portion of the plurality of encoders.

10. The non-transitory computer-readable storage medium of claim 9, comprising instructions that when executed by the processor, cause the processor to:

determine whether the confidence is greater than or equal to the threshold; and generate the output based on the intermediate result and cease computation via the NLP inference model based on a determination that the confidence is greater than or equal to the threshold.

11. The non-transitory computer-readable storage medium of claim 10, comprising instructions that when executed by the processor, cause the processor to generate the output via the NLP inference model based on a determination that the confidence is not greater than or equal to the threshold.

12. The non-transitory computer-readable storage medium of claim 9, comprising instructions that when executed by the processor, cause the processor to derive the output based the plurality of the encoders and the second classifier.

13. The non-transitory computer-readable storage medium of claim 9, comprising instructions that when executed by the processor, cause the processor to not process a second portion of the plurality of encoders to cease computation via the NLP inference model, where the second portion of the plurality of encoders is mutually exclusive of the first portion of the plurality of encoders.

14. The non-transitory computer-readable storage medium of claim 9, wherein the second lexicon comprises a vocabulary of a plurality of tokens and the first lexicon comprises a vocabulary including a sub-set of the plurality of tokens and the vocabulary of the first lexicon is selected based in part on a statistical measurement of usage of the tokens of the vocabulary of the second lexicon.

15. A computer-implemented method, comprising:
generating, via an NLP inference model comprising a plurality of encoders, a first classifier associated with a first lexicon and a second classifier associated with a second lexicon, where the first lexicon is a sub-set of the second lexicon, an intermediate result and a confidence associated with the intermediate result based on a first portion of the plurality of encoders and the first classifier, wherein the NLP inference model is executed on a single device;
comparing the confidence to a threshold; and
based on the comparison, either:
generating an output based on the intermediate result from the first portion of the plurality of encoders and the first classifier and cease computation via the NLP inference model; or
generating the output via the NLP inference model based on a second portion of the plurality of encoders and the second classifier, each encoder of the second portion of the plurality of encoders different from the first portion of the plurality of encoders.

16. The computer-implemented method of claim 15, comprising:
determining whether the confidence is greater than or equal to the threshold; and
generating the output based on the intermediate result and cease computation via the NLP inference model based on a determination that the confidence is greater than or equal to the threshold.

17. The computer-implemented method of claim 16, comprising generating the output via the NLP inference model based on a determination that the confidence is not greater than or equal to the threshold.

18. The computer-implemented method of claim 17, comprising not processing a second portion of the plurality of encoders to cease computation via the NLP inference model, where the second portion of the plurality of encoders is mutually exclusive of the first portion of the plurality of encoders.

19. The computer-implemented method of claim 17, wherein the second lexicon comprises a vocabulary of a plurality of tokens and the first lexicon comprises a vocabulary including a sub-set of the plurality of tokens and the vocabulary of the first lexicon is selected based in part on a statistical measurement of usage of the tokens of the vocabulary of the second lexicon.

20. The computer-implemented method of claim 15, comprising:
deriving the intermediate result and the confidence based on a first portion of the plurality of encoders and the first classifier; and
deriving the output based the plurality of the encoders and the second classifier.

* * * * *